(12) United States Patent
Ueda

(10) Patent No.: US 8,052,817 B2
(45) Date of Patent: Nov. 8, 2011

(54) MANUFACTURING METHOD OF PNEUMATIC TIRE

(75) Inventor: Ryuichi Ueda, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 736 days.

(21) Appl. No.: 12/108,090

(22) Filed: Apr. 23, 2008

(65) Prior Publication Data

US 2008/0289741 A1 Nov. 27, 2008

(30) Foreign Application Priority Data

May 24, 2007 (JP) ................................ 2007-138034

(51) Int. Cl.
*B29D 30/30* (2006.01)
*B29D 30/42* (2006.01)
*B60C 9/18* (2006.01)

(52) U.S. Cl. ......... 156/117; 152/531; 152/532; 156/130
(58) Field of Classification Search .................. 156/117, 156/130; 152/531, 532, 533
See application file for complete search history.

(56) References Cited

U.S. PATENT DOCUMENTS

| | | | | |
|---|---|---|---|---|
| 4,272,309 A | * | 6/1981 | Payne et al. | 156/117 |
| 4,895,692 A | * | 1/1990 | Laurent et al. | 264/326 |
| 6,425,426 B1 | * | 7/2002 | Osborne et al. | 152/209.5 |
| 6,619,357 B1 | * | 9/2003 | Gillard et al. | 152/531 |
| 2006/0225824 A1 | | 10/2006 | Kuwajima et al. | |

FOREIGN PATENT DOCUMENTS

| | | |
|---|---|---|
| EP | 242840 A1 * | 10/1987 |
| JP | 2001-310604 | 11/2001 |
| JP | 2002-18977 | 1/2002 |
| JP | 2003-225953 | 8/2003 |
| JP | 2005-075037 | 3/2005 |

\* cited by examiner

*Primary Examiner* — Geoffrey L Knable

(74) *Attorney, Agent, or Firm* — Fish & Richardson P.C.

(57) ABSTRACT

First, a first belt ply is wound around an outer peripheral surface of a belt drum having a curvature so as to be formed as a tubular shape, and a rubber layer protruding to an outer side than an end portion in a width direction of a belt reinforcing layer is arranged in an outer periphery of an end portion in a width direction of the first belt ply. Further, a second belt ply which is narrower than the first belt ply is wound around an outer periphery of the second belt ply so as to be formed as a tubular shape, and a belt layer is formed in such a manner that the first belt ply and the second belt ply are laminated. The belt reinforcing layer is formed by spirally winding a rubber-coated reinforcing cord around an outer peripheral side of the formed belt layer, and an end portion in a width direction of the belt reinforcing layer is arranged in an outer side than the first belt ply.

1 Claim, 2 Drawing Sheets

MANUFACTURING METHOD OF PNEUMATIC TIRE

BACKGROUND OF THE INVENTION

1. Field of the Invention

The present invention relates to a manufacturing method of a pneumatic tire, and more particularly to a manufacturing method of a pneumatic tire in which a belt reinforcing layer is constituted by a spiral belt.

2. Description of the Related Art

Conventionally, in a pneumatic tire, in order to reinforce a carcass with a so-called hoop effect, a belt layer and a belt reinforcing layer are arranged in an outer periphery of the carcass. Generally, the belt layer is formed by winding a first belt ply around an outer peripheral surface of a belt drum so as to be formed as a tubular shape, and thereafter winding a second belt ply around an outer periphery thereof so as to be formed as a tubular shape. The belt plies include cords which are inclined with respect to a tire circumferential direction, for example, at an angle between 10 and 40 degrees, and are laminated in such a manner that the cords intersect with each other between the plies.

Further, the belt reinforcing layer is constituted by a reinforcing ply including a reinforcing cord which is substantially in parallel to the tire circumferential direction, and there is a case that the belt reinforcing layer is formed by winding a sheet-like reinforcing ply around an outer periphery of the belt layer. However, for the purpose of increasing a high-speed durability or the like, there has been known a method of spirally winding a rubber-coated long reinforcing cord around an outer periphery of the belt layer so as to be formed as a so-called spiral belt (for example, Japanese Unexamined Patent Publication Nos. 2001-310604 and 2005-75037).

A tread rubber is attached on the outer periphery of the belt reinforcing layer so as to be integrated, and a tubular belt and tread assembly is formed. The assembly is transferred to another forming drum, and is retained in an outer peripheral side of a cylindrical member obtained by attaching an inner liner, a carcass, a bead core, a bead filler, a side wall and the like formed on the forming drum. Further, a green tire obtained by integrating the cylindrical member and the belt and tread assembly is formed by applying an internal pressure to the cylindrical member so as to be evaginated and deformed and bringing the carcass into pressure contact with an inner peripheral surface of the belt layer.

The formed green tire is set to a vulcanization forming mold, and is vulcanization formed in a state in which a tread portion is brought into pressure contact with an inner surface of the forming mold. At this time, since the inner surface of the forming mold is formed as a curved shape which protrudes to an outer side in a diametrical direction, the tread portion of the green tire is deformed in such a manner that a center portion is diametrically expanded, and the belt layer and the belt reinforcing layer are accordingly expansion deformed. However, there is a case that the belt layer generates a local deformation caused by the cord structure mentioned above. If the cord arrangement is disturbed thereby, there is a case that a dispersion is generated in a rigidity of the tread portion and a tire performance is deteriorated.

Accordingly, there has been proposed a structure in which the belt layer is formed by a drum-shaped belt drum having an outer peripheral surface protruding to an outer side in a diametrical direction, in place of a normal belt drum having an outer peripheral surface being in parallel in an axial direction (for example, Japanese Unexamined Patent Publication Nos. 2002-18977 and 2003-225953). Therefore, it is possible to previously apply a curvature to the belt layer, and it is possible to prevent the belt layer from generating a local deformation at a time of the vulcanization forming.

However, in the case of using the belt drum having the curvature mentioned above, an inclination becomes large particularly near an end portion in a width direction of the belt layer. Accordingly, there is a problem that the reinforcing cord falls down to an outer side and can not be accurately wound, at a time of forming the spiral belt as described in Japanese Unexamined Patent Publication No. 2002-18977. As a countermeasure thereof, there can be considered to arrange the end portion in the width direction of the spiral belt in an inner side than the belt layer as described in Japanese Unexamined Patent Publication No. 2003-225953, however, in this case, a constraint force of the end portion in the width direction of the belt layer is reduced, and there is generated a problem that a reinforcing effect by the belt reinforcing layer can not be sufficiently obtained.

SUMMARY OF THE INVENTION

The present invention is made by taking the actual condition mentioned above into consideration, and an object of the present invention is to provide a manufacturing method of a pneumatic tire which can suitably form a spiral belt while using a belt drum having a curvature, and can secure a reinforcing effect of a belt layer.

The object can be achieved by the following present invention. That is, the present invention provides a manufacturing method of a pneumatic tire comprising:

a first step of laminating a plurality of belt plies so as to form a belt layer; and a second step of forming a belt reinforcing layer by spirally winding a rubber-coated reinforcing cord around an outer periphery of the belt layer, wherein the first step has a step of winding a first belt ply around an outer peripheral surface of a belt drum so as to form in a tubular shape by using the belt drum formed as a circular arc shape in which an outer peripheral cross sectional shape along an axial direction protrudes to an outer side in a diametrical direction, a step of arranging a rubber layer protruding to an outer side than an end portion in a width direction of the belt reinforcing layer, in an outer periphery of an end portion in the width direction of the first belt ply, and a step of winding a second belt ply which is narrower than the first belt ply, around an outer periphery of the first belt ply so as to form in a tubular shape, and wherein the second step arranges the end portion in the width direction of the belt reinforcing layer in an outer side than the first belt ply.

In the manufacturing method of the pneumatic tire in accordance with the present invention, the belt layer is formed by a first step, and the belt reinforcing layer is formed by a second step. The belt reinforcing layer is formed as the spiral belt obtained by spirally winding the rubber-coated reinforcing cord, and the end portion in the width direction is arranged in the outer side than the end portion in the width direction of a first belt ply. Accordingly, it is possible to suitably constrain the end portion in the width direction of the belt layer by the belt reinforcing layer, and it is possible to sufficiently secure the reinforcing effect of the belt layer. Further, in the present invention, it is possible to prevent the reinforcing cord from falling down to the outer side near the end portion in the width direction of the belt layer at a time of forming the spiral belt forming the belt reinforcing layer, by arranging a rubber layer protruding to the outer side than the end portion in the width direction of the belt reinforcing layer, in the outer periphery of the end portion in the width direction of the first belt ply, in the first step. As a result, it is possible to accurately wind the reinforcing cord so as to suitably form the spiral belt, while using the belt drum having the curvature.

In the structure mentioned above, it is preferable that the rubber layer is formed by a band-like body extending along a circumferential direction, and an outer peripheral surface thereof is formed by a concavo-convex surface obtained by arranging a plurality of circumferential grooves.

In accordance with the structure mentioned above, since the rubber layer is formed by the band-like body extending along the circumferential direction, and the outer peripheral surface thereof is formed by the concavo-convex surface obtained by arranging a plurality of circumferential grooves, it is possible to effectively prevent the reinforcing cord from falling down at a time of forming the spiral belt as the belt reinforcing layer, and it is possible to more suitably form the spiral belt.

DETAILED DESCRIPTION OF THE PREFERRED EMBODIMENTS

Figure 1:
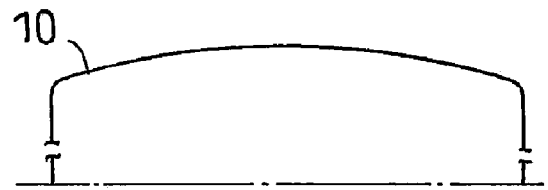
FIG. 1 is a vertical cross sectional view of a belt drum.

An embodiment of the present invention will be explained with reference to the drawings. FIG. 1 is a vertical cross sectional view of a belt drum used in the present embodiment. A belt drum 10 is structured such as to be diametrically expandable and compressible, and an outer peripheral cross sectional shape along an axial direction is formed as a circular arc shape protruding to an outer side in a diametrical direction, at least in a diametrically expanded state shown in FIG. 1. An outer peripheral surface of the belt drum 10 has one radius of curvature or a plurality of radii of curvature, and has a curvature which is close to a curvature of a belt layer of a product tire after a vulcanization forming. In the belt drum 10, a belt and tread assembly is formed. A step of forming the belt and tread assembly has a first step of laminating a plurality of belt plies so as to form a belt layer, and a second step of forming a belt reinforcing layer in an outer periphery of the formed belt layer, as in detail described below.

Figure 2:
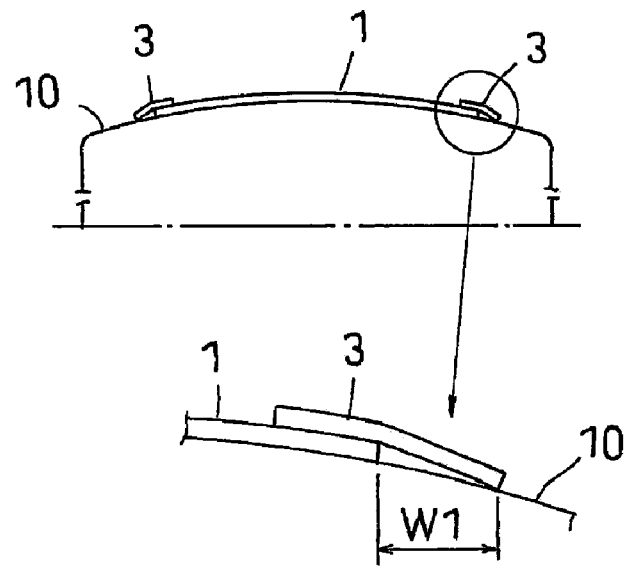
FIG. 2 is a vertical cross sectional view showing a state in which a belt layer is formed.

The first step first wind a belt ply 1 (corresponding to the first belt ply) around an outer peripheral surface of the belt drum 10 in the diametrically expanded state so as to form in a tubular shape, as shown in FIG. 2. The belt ply 1 is structured by a sheet-like ply obtained by rubber coating a plurality of steel cords arranged so as to be inclined, for example, at an angle between 10 and 40 degrees with respect to a tire circumferential direction (corresponding to a circumferential direction of the belt drum 10).

Next, a band-like rubber layer 3 formed as a rectangular cross sectional shape is arranged in an outer periphery of an end portion in a width direction of the belt ply 1. The rubber layer 3 is attached in such a manner as to cover the end portion in the width direction of the belt ply 1 along the tire circumferential direction, and is arranged in such a manner as to protrude to an outer side than the end portion in the width direction of the belt ply 1, further in such a manner as to protrude to an outer side than an end portion in the width direction of a belt reinforcing layer 7 formed in the post step. A protruding width W1 of the rubber layer 3 from the end portion in the width direction of the belt ply 1, the protruding width being measured along the axial direction of the drum is, for example, between 2 and 10 mm.

The rubber constituting the rubber layer 3 may be a different kind of rubber from a tread rubber 4 mentioned below, and a rubber hardness measured based on a durometer hardness test (type A) of JISK6253 is, for example, between 75 and 85 degrees. Further, a thickness of the rubber layer 3 is exemplified by 0.6 mm in the case that a thickness of the belt ply 1 is 1.2 mm. In this case, the structure is not limited to the structure obtained by attaching the rubber layer 3 to the end portion in the width direction of the tubular formed belt ply 1, but the structure may be obtained by previously attaching the rubber layer 3 to the end portion in the width direction of the belt ply 1 and winding the rubber layer 3 around the belt drum 10 so as to form in the tubular shape.

Figure 3:
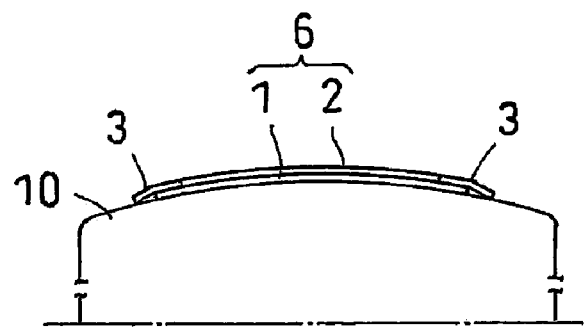
FIG. 3 is a vertical cross sectional view showing a state in which a belt layer is formed.

Subsequently, as shown in FIG. 3, a belt ply 2 (corresponding to the second belt ply) which is narrower than the belt ply 1 is wound around the outer periphery of the belt ply 1 so as to be formed as a tubular shape, and a belt layer 6 is formed by laminating the belt ply 1 and the belt ply 2. The belt layer 6 is curved in correspondence to a curvature of the outer peripheral surface of the belt drum 10, and is formed as a drum shape in which a diameter of a center portion in the width direction is larger than a diameter in both sides in the width direction. FIG. 3 shows that the belt ply 2 and the rubber layer 3 confront with each other between their end portions, however, the end portion in the width direction of the belt ply 2 may be lapped over the rubber layer 3 in the present invention.

The belt ply 2 is structured in the same manner as the belt ply 1, and is laminated such that steel cords intersect with each other between the belt ply 1 and the belt ply 2. In this case, the cord constituting the belt plies 1 and 2 is not limited to the steel cord, but can employ an organic fiber cord such as a polyester, a rayon, a nylon, an aramid or the like, and it is possible to employ them by combining them.

Figure 4:
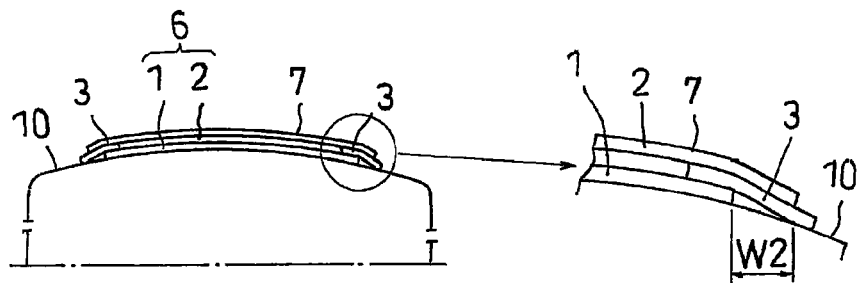
FIG. 4 is a vertical cross sectional view showing a state in which a belt reinforcing layer is formed.

After forming the belt layer 6 as mentioned above, a belt reinforcing layer 7 as shown in FIG. 4 is formed in the second step. The second step spirally winds the rubber-coated long reinforcing cord along the circumferential direction, and forms the spiral belt so as to form a belt reinforcing layer 7. The reinforcing cord constituting the belt reinforcing layer 7 is arranged substantially in parallel to the tire circumferential direction. In the present embodiment, there is shown an example in which one belt reinforcing layer 7 is formed, however, a plurality of belt reinforcing layers may be laminated by further forming the belt reinforcing layer on the belt reinforcing layer 7.

As the reinforcing cord mentioned above, the steel cord may be employed in addition to the organic fiber cord such as the polyester, the rayon, the nylon, the aramid or the like. Further, one reinforcing cord may be coated by the rubber, or a plurality of reinforcing cords may be coated like a ribbon shape by the rubber. However, in the present invention, taking into consideration the matter that the reinforcing cord is formed in the outer periphery of the belt layer 6 having the curvature, the former is preferable in the light of uniformizing tensions applied to the respective reinforcing cords.

At a time of forming the spiral belt, a winding start end or terminal end of the reinforcing cord is defined in such a manner that the end portion in the width direction of the belt reinforcing layer 7 is arranged in the outer side than the belt ply 1. Accordingly, it is possible to suitably constrain the end portion in the width direction of the belt layer 6 by the belt reinforcing layer 7 so as to sufficiently secure the reinforcing effect of the belt layer 6 and improve a high-speed durability or the like. A protruding width W2 of the belt reinforcing layer 7 from the end portion in the width direction of the belt ply 1 is measured along the drum axial direction, and the protruding width W2 is, for example, between 2 and 10 mm. As mentioned above, in accordance with the present invention, the belt reinforcing layer 7 is arranged in the inner side than the end portion in the width direction of the rubber layer 3, and the belt ply 1 is arranged in the inner side than the end portion in the width direction of the belt reinforcing layer 7.

Further, at a time of forming the spiral belt, since the inclination is large near the end portion in the width direction of the belt layer 6, the reinforcing cord tends to fall down to the outer side in the case that the reinforcing cord is intended to be wound around the outer peripheral surface of the belt drum 10 so as to protrude to the outer side from the belt layer 6. However, in the present invention, since the rubber layer 3 is arranged in the end portion in the width direction of the belt layer 6, it is possible to wind the reinforcing cord around the outer peripheral surface of the rubber layer 3. Accordingly, it is possible to prevent the reinforcing cord from falling down so as to suitably form the spiral belt, and it is possible to contribute to securing the reinforcing effect of the belt layer 6 mentioned above.

Figure 5:
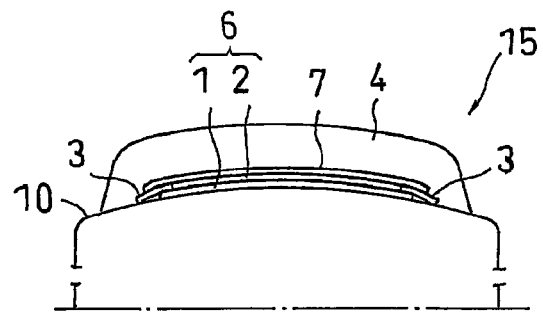
FIG. 5 is a vertical cross sectional view showing a state in which a belt and tread assembly is formed.

After forming the belt layer 6 and the belt reinforcing layer 7, a belt and tread assembly 15 is formed by attaching a tread rubber 4 to the outer periphery of the belt layer 6 and the belt reinforcing layer 7 so as to integrate, as shown in FIG. 5. Further, the belt drum 10 is diametrically compressed and the belt and tread assembly 15 is transferred to another forming drum. Thereafter steps are as mentioned above. That is, the belt and tread assembly 15 is arranged in an outer peripheral side of a cylindrical member obtained by attaching the carcass, the bead core or the like, the green tire is formed by bringing the carcass into pressure contact with the inner peripheral surface of the belt layer 6, and the vulcanization forming is applied to the green tire.

Figure 6:
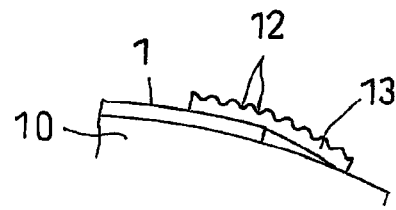
FIG. 6 is a vertical cross sectional view showing an end portion in a width direction of a first belt ply in accordance with another embodiment.
Figure 7:
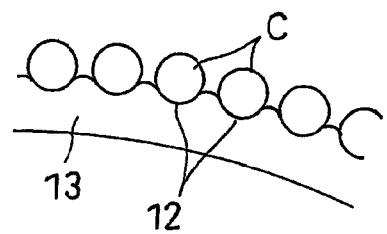
FIG. 7 is a vertical cross sectional view showing in an enlarged manner an outer peripheral surface of a rubber layer in accordance with another embodiment.

In the present invention, as shown in FIG. 6, it is preferable to employ a rubber layer 13 in which an outer peripheral surface is formed by a concavo-convex surface obtained by arranging a plurality of circumferential grooves 12. Accordingly, at a time of forming the spiral belt so as to form the belt reinforcing layer 7, it is possible to effectively prevent the reinforcing cord from falling down, and it is possible to suitably form the spiral belt. In the case mentioned above, it is possible to make each of the reinforcing cords C drop into the circumferential groove 12 so as to prevent the reinforcing cord from falling down, as shown in FIG. 7, by forming the circumferential groove 12 spirally, and winding one rubber-coated reinforcing cord.

In the manufacturing method of the pneumatic tire in accordance with the present invention, any of the conventionally known materials, shapes, structures and manufacturing methods can be employed in the present invention except the matter that the belt layer and the belt reinforcing layer are formed as mentioned above.

What is claimed is:

1. A method of manufacturing a pneumatic tire comprising:
a first step of laminating a first belt ply and a second belt ply so as to form a belt layer which is subsequently attached to a carcass; and
a second step of forming a belt reinforcing layer by spirally winding a rubber-coated reinforcing cord around an outer periphery of the belt layer,
wherein a rubber layer is formed by a pair of spaced apart band-like bodies extending along a circumferential direction, each of the band-like bodies covering and protruding beyond an end portion of the first belt ply in a width direction, an outer peripheral surface of the rubber layer being formed by a concavo-convex surface obtained by arranging a plurality of circumferential grooves, and the reinforcing cord being wound on the concavo-convex surface,
wherein the first step has a step of winding the first belt ply around an outer peripheral surface of a belt drum so as to form in a tubular shape by using the belt drum formed as a circular arc shape in which an outer peripheral cross sectional shape along an axial direction protrudes to an outer side in a diametrical direction, a step of arranging the rubber layer protruding to an outer side of an end portion in a width direction of the belt reinforcing layer, in an outer periphery of an end portion in the width direction of the first belt ply, and a step of winding the second belt ply which is narrower than the first belt ply, around an outer periphery of the first belt ply so as to form in a tubular shape, and
wherein the second step arranges the end portion in the width direction of the belt reinforcing layer in an outer side of the first belt ply.

* * * * *